Feb. 7, 1939.   J. S. LOSEE   2,146,022
ELECTRIC WATER HEATER
Filed Aug. 5, 1937   2 Sheets-Sheet 1

INVENTOR
JOSEPH S. LOSEE
By A. S. Krob
Attorney

Patented Feb. 7, 1939

2,146,022

UNITED STATES PATENT OFFICE 2,146,022

ELECTRIC WATER HEATER

Joseph S. Losee, Hebron, Ill., assignor to Losee Products Company, Hebron, Ill., a corporation of Illinois Application August 5, 1937, Serial No. 157,474

11 Claims. (Cl. 219—39)

REISSUED
MAR 12 1940

The present invention relates to water heaters which are particularly adapted for dairy use, wherein the heating is preferably by electric current and the temperature of the water is maintained continuously by means of a thermally controlled switch.

One of the objects of the present invention is to provide economical means for maintaining a constant supply of hot water ready at all times, and wherein when a certain quantity of hot water is desired an equal quantity of cold water is poured into an open receptacle provided for the purpose, the added cold water acting to displace an equal quantity of hot water.

A further object of the present invention is to provide means whereby the loss of heat by conduction or radiation is reduced to a minimum.

A further object of the present invention is to supply convenient means for access to the thermostat and heating element whereby they may be conveniently inspected, removed and replaced.

Another object of the present invention is to provide a chamber for the heating and controlling means, whereby the heating element may be removed for draining the water from the container.

An important object of the present invention is to provide means whereby the water cannot be drained from the container by accident or carelessness.

To these and other useful ends my invention consists of parts, combinations thereof or their equivalents and mode of operation as described and claimed and shown in the accompanying drawings in which:

Figure 1:
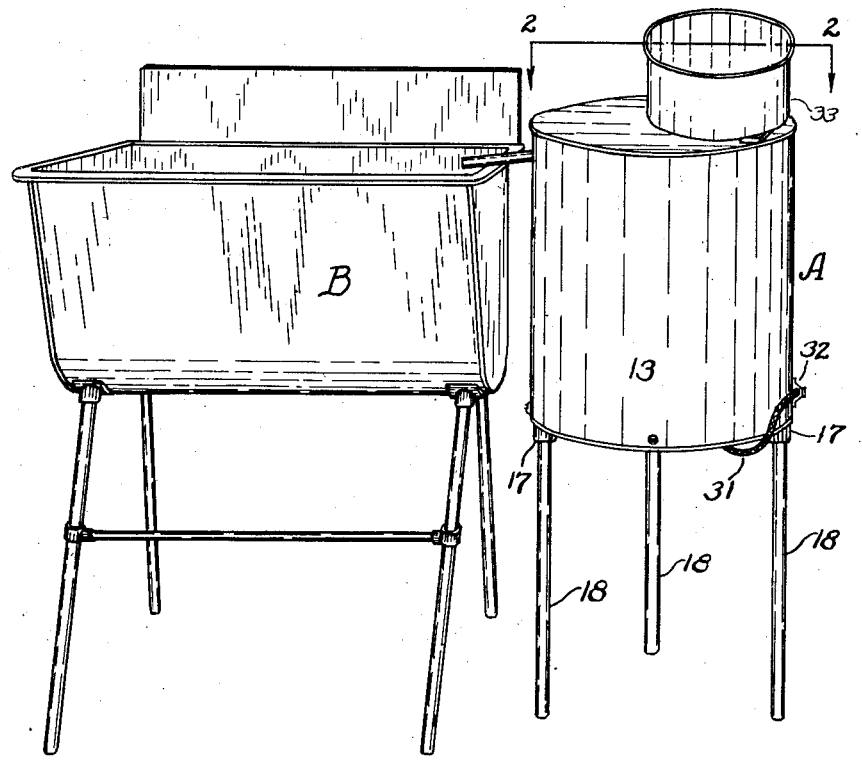
Fig. 1 is a front elevation of my complete heating unit including a conventional washing tank.

As thus illustrated, the present invention is designated in its entirety by reference character A and the washing tank which forms no part of this invention but is shown for the purpose of illustration, is designated in its entirety by reference character B.

I provide a closed water tank having preferably a cylindrical wall 10, a top head 11 and a bottom head 12. I provide an inclosure for the water tank as clearly illustrated in Figure 2 having preferably a cylindrical wall 13, a top head 14 and a bottom head 15. The bottom head is preferably cast integral and is provided with a peripheral flange 16 which is adapted to be embraced by the bottom edge of member 13 and is secured thereto in any suitable manner. Member 15 is provided with a suitable number of sockets 17 to which supporting legs 18 are secured.

Figure 2:
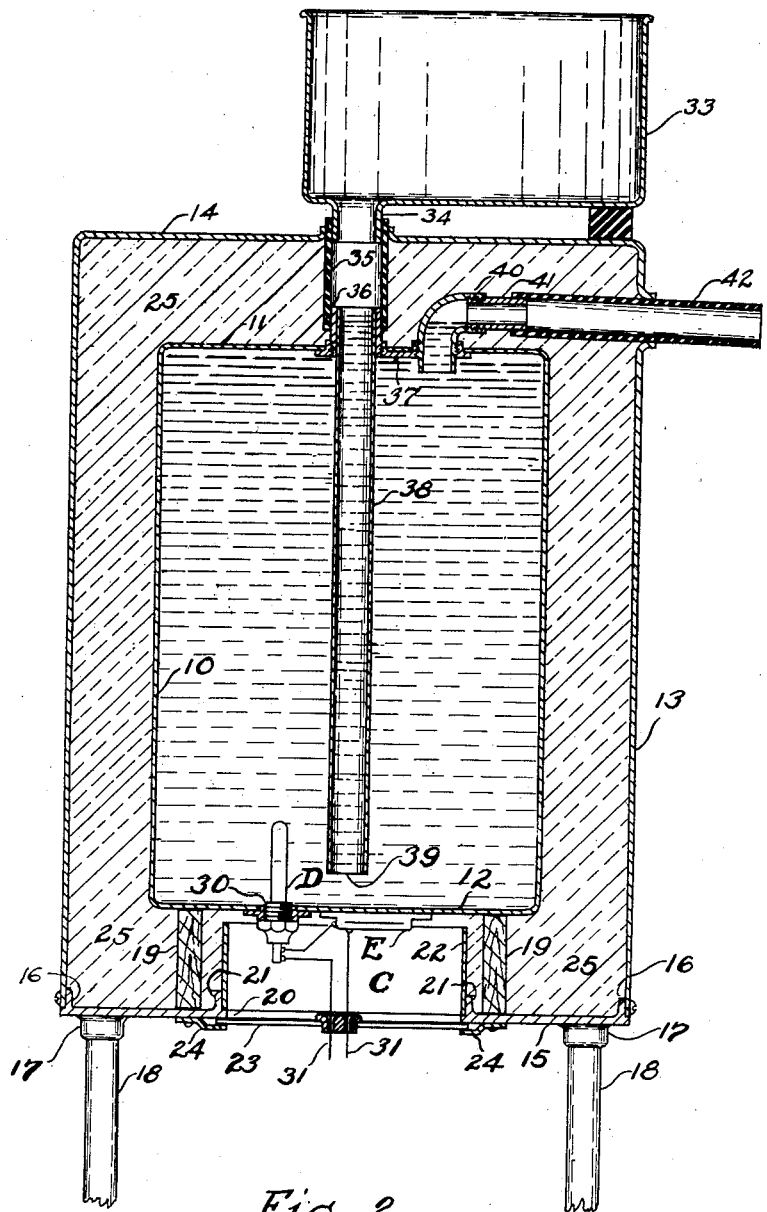
Fig. 2 is a vertical elevation of my invention sectioned on line 2—2 of Figure 1.

The water tank is preferably supported on member 15 by means of wood strips 19—19. Member 15 is provided with a circular opening 20 having an annular flange 21 which is adapted to act as a positioner and support for an annular member 22. This member extends to within a short distance of member 12 as illustrated in Figure 2 and forms a chamber C.

Thus when the insulating material 25 is packed into the space between members 12 and 15 and between members 22, 10 and 13 and betweeen members 11 and 14, the water tank is completely insulated against passage of heat from the tank to its housing enclosure.

Member D comprises an electric heating element which is preferably screw threaded into a flange as at 30. Member E comprises a thermally operated switch having an electrical connection to element D and suitable feed wires 31—31 which preferably extend through an insulated opening in member 23 and lead preferably to a wall socket 32 which is secured to member 13 as illustrated in Figure 1. Thus when unit A is suitably positioned it may easily be connected to a source of electrical supply.

I provide a lid 23 having clips 24—24 which are adapted to removably secure the lid to member 15 forming a complete enclosure. After members D and E are positioned in chamber C this chamber may also be packed with insulating material, and closed by member 23.

The thermal device and its switch will operate as follows: The switch may be adjusted to close its circuit say when the temperature of the water in the bottom of the tank falls below 170° and the heating element will then act to raise the temperature and when the temperature of the water rises slightly above 170° switch E will be opened, thus to disconnect the heating element. Clearly the device will operate automatically to maintain a desired temperature.

Thus it will be seen by scrutinizing Figure 2, that there are no metal contacts between the bottom of the water tank and member 15 and that the only metal extending to the exterior is wires 31 and since chamber C may be packed with insulating material, there can be very little or no radiation or conduction of heat from the bottom of the tank to members 15 or 23.

One of the advantages of the design shown is that when it is so desired, the tank may be drained by simply removing the insulating material in chamber C and detaching element D. This, however, will be necessary at infrequent intervals.

I provide novel means for supplying hot water from the water tank when needed in the following manner: A tank 33 is mounted on top of the housing as illustrated. This tank is provided with an outlet comprising a metal tube 34, a rubber hose 35, a short metal nipple 36 which is screw threaded into flanged member 37 as illustrated. Nipple 36 is provided with a tube 38 which extends to near the bottom of the water tank as at 39.

I provide an elbow 40 which is screw threaded in member 37 extending preferably a short distance below the bottom of member 37. A short nipple 41 is screw threaded into elbow 40 to which I secure a rubber hose 42. This hose is positioned at a slight downwardly extending angle to thereby prevent the water from running back on the bottom of the hose and contacting member 13. Hose 42 and 35 are each closely embraced by housing flanges as illustrated. When the tank is filled, clearly the water level cannot rise above the bottom of the opening in nipple 41.

It will be understood that the water in members 38 and 40 will answer as a trap to prevent the escape of freed vapor which may gather at the surface of the water in tank 10.

Thus it will be seen that I provide a connection from tank 33 to near the bottom of the water tank and an outlet from the top of the water tank, each of which will not conduct heat from the water tank or its contents to the housing, tank 33, or to the exterior, largely because members 35 and 42 are each made from heat insulating material and because of the fact that these members are never filled with water except at short infrequent intervals.

The operation of the device is as follows: For example, if an operator wishes a full bucket of hot water, he simply pours a full bucket of cold water into tank 33 and an equal quantity of hot water will then be forced from the top of the water tank into member B or into some other receptacle. Clearly the cold water will accumulate at the bottom of the tank and hot water will always drain from the top of the tank. When a fresh supply of cold water is added, the thermostat switch E will immediately connect the heating element D which will then heat the fresh supply of cold water to the predetermined temperature.

In Figure 1 I illustrate unit B for the purpose of showing a type of equipment wherein this unit is used to wash utensils, milk cans, etc. Clearly, this unit is not necessary for the successful operation of applicant's device. It is however, desirable.

It will be noted that I have preferably positioned tube 38 concentrically, thus member 33 may be moved with member 35 as an axis whereby the operator may place member 33 in the most convenient position for pouring in the fresh supply of water.

I have illustrated my invention in its preferred form. It will be understood that various minor changes may be made without departing from the spirit and scope of the invention as recited in the appended claims.

Having thus shown and described my invention I claim:

1. A device of the class described, comprising a water tank having heating means at the bottom thereof, a normally empty supply tank secured to the top of said water tank and having a drain tube extending through the top of and to near the bottom of said tank, a normally empty outlet pipe having a connection into the top of said tank, whereby water poured into said supply tank will cause an equal quantity to be displaced and escape through said outlet pipe, said drain tube and outlet pipe being adapted to act as a seal to prevent the escape of freed vapor.

2. A device of the class described, comprising a water tank having heating means at the bottom thereof, an open supply tank positioned above and spaced from the top of said water tank and having an open drain tube extending through the top of and to near the bottom of said water tank, a normally empty outlet pipe having a connection into the top of said water tank, whereby water poured into said supply tank is free to flow into said water tank and cause an equal quantity to be displaced and escape through said outlet pipe, said heating means comprising an electric heating element being extended into the bottom of said water tank and having an operatively connected thermostat controlled switch, whereby the water in said water tank will be heated and held to a predetermined temperature, the portion of said drain tube between said tanks being made of a heat resisting material.

3. A device of the class described, comprising an inclosure having therein a closed water tank of a size to thereby provide an insulating space therebetween, an open supply tank positioned above said inclosure having a normally empty tube extending through the upper ends of said inclosure and water tank and extending to near the bottom of said water tank, a normally empty open water outlet connection in the top of said tank and extending transversely through said insulating space, an electric heating element extending into said water tank near the bottom thereof and having an operatively connected thermally controlled switch in heat exchange contact with said tank whereby the water temperature in said tank will be automatically maintained, and whereby a quantity of water poured into said supply tank will cause an equal quantity to escape from said water tank through said outlet tube.

4. A device of the class described, comprising an inclosure having therein a closed water tank of a size to provide an insulating space therebetween being filled with an insulating material, an open supply tank positioned above said device having a drain tube extending through the upper heads of said inclosure and water tank and to near the bottom of said water tank, an open water outlet connection in the top of said water tank and extending through said insulating space, an electric heating element in heat exchange contact with the water in said tank near the bottom thereof and having an operatively connected thermally controlled switch whereby the water temperature in said tank will be automatically maintained, and whereby a quantity of water poured into said supply tank will cause an equal quantity to escape through said outlet tube, said drain tube and outlet connection being positioned to thereby remain normally empty in the portion passing through said insulating material.

5. A device of the class described, comprising an enclosure having therein a closed water tank of a size to thereby provide an insulating space therebetween, an open supply tank positioned above said enclosure having a drain tube extending through the wall of said enclosure, through said insulating space and into said water tank terminating near the bottom thereof, an outlet connection at the top of said water tank extending through said insulating space to the exterior, the portion of said outlet connection extending through said insulating space and to the end of the tube being adapted to remain normally empty and to also cause said open supply tank and its drain tube to remain normally empty to a point adjacent the top of said water tank, whereby a quantity of water poured into said supply tank will flow into said water tank and cause an equal quantity to escape through said outlet tube, an electric heating element positioned at or near the bottom of said tank and adapted to heat the water therein and being operatively connected to a thermally controlled switch, said switch being in heat exchange relation with said tank and having means whereby the water in said tank may be automatically maintained at a predetermined temperature.

6. A device of the class described, comprising an enclosure having therein a normally full liquid tank of a size to provide an insulating space therearound being filled with a heat insulating material, an open supply tank positioned above said device having a drain tube extending through the upper heads of said inclosure and water tank and to near the bottom of said tank, an open water outlet tube in the top of said liquid tank and extending through said insulating space, an electric heating element extending into said tank near the bottom thereof and having an operatively connected thermally controlled switch in heat exchange contact with said tank whereby the water temperature in said tank will be automatically maintained, and whereby a quantity of water poured into said supply tank will cause an equal quantity to escape from said liquid tank through said outlet tube.

7. A device of the class described, comprising a housing having therein a closed tank of a size to provide a space therearound being filled with insulating material, means in the bottom of said tank for heating liquid therein, a vertically positioned supply tube extending through said insulating material and the tops of said housing and tank to near the bottom of said tank, an open liquid outlet tube connection in the top of said tank and extending to the exterior of said housing, the part of said supply and outlet tube extending through said insulating material being made from heat insulating material to thereby prevent heat transfer from said tank to said housing or to the exterior, said supply and outlet tubes being positioned to thereby remain normally empty in the portion thereof which is positioned in said insulated space.

8. A device of the class described, comprising a housing having therein a closed water tank leaving a space therearound being filled with insulating material, means near the bottom of said tank adapted to heat the water therein, a supply tank positioned above said housing and having an open drain connection through the top heads of said housing and water tank and extending downward to near the bottom of said water tank, an open outlet pipe extending from the top of said water tank through said insulating material and housing, whereby when a quantity of water is placed in said supply tank it will flow into said water tank and cause an equal quantity to be displaced and escape through said outlet pipe, portions of said outlet connection and drain pipe in said space being made from heat insulating material, said portions being positioned whereby they will remain normally clear of liquid.

9. A device of the class described, comprising a housing having therein a closed liquid tank of a size to thereby provide a space therearound and being filled with insulating material, means at the bottom of said tank for heating the liquid therein, normally open inlet and outlet connections for said tank, a portion of each said connections being positioned in said space being made of heat isulating material.

10. A device of the class described, comprising a closed water tank having a heat insulating covering, a relatively small access opening in the bottom of said covering to said tank, means in said opening adapted to extend into the bottom of said tank and heat the liquid therein, an open inlet tube connection in the top of said tank, a normally empty outlet tube in the top of said tank, the portions of said inlet and outlet tubes extending through said insulating covering being made from heat insulating material, said inlet connection having means to conduct the liquid to near the bottom of said tank.

11. A device of the class described, comprising in combination a normally full water tank having a heat insulating container, means adapted to heat the water in the bottom of said tank by means of heat exchange contact therewith, means for draining water from the top of said tank, a vertically and centrally positioned inlet pipe extended to near the bottom of the tank and protruding through said container, a filler tank having a rotatable drain connection at one side to said protruding end, said filler tank having supporting means being spaced from said protruding end, whereby it may be rotated and supported in any desired position around said protruding end.

JOSEPH S. LOSEE.